Figure 1:
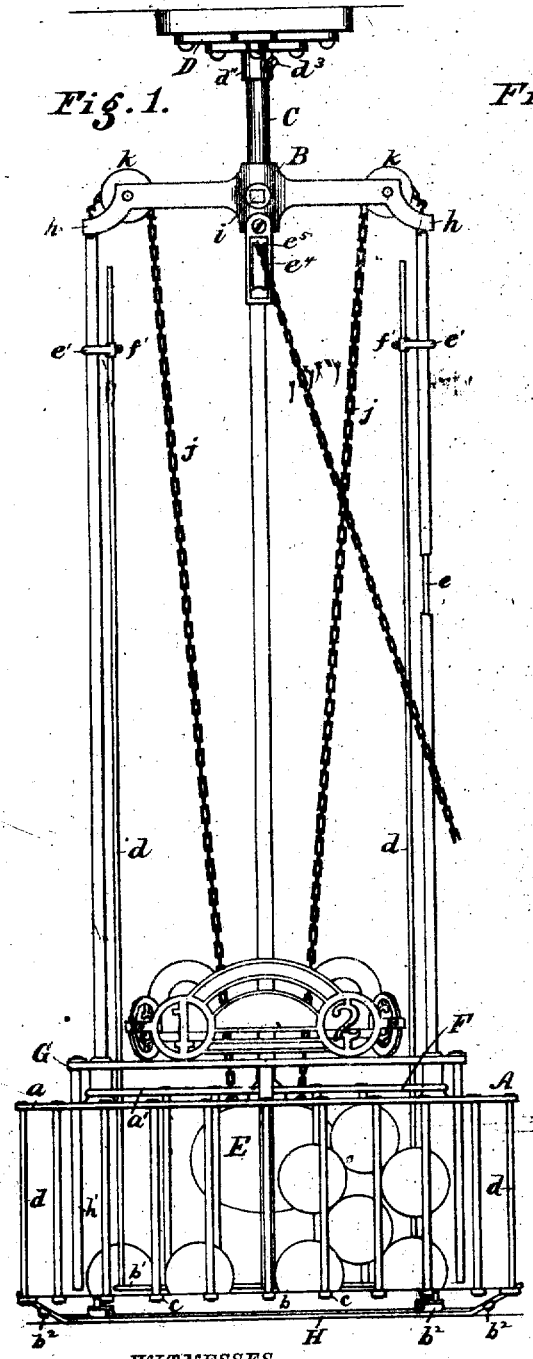

2 Sheets—Sheet 1.

G. HENKEL.

COMBINED POOL RACK AND BALL SPOTTER.

No. 10,801. Reissued Jan. 25, 1887.

WITNESSES

F. Willis Raines

P. B. Clevenger

INVENTOR

George Henkel

By Chas. N. Stratton

Attorney

G. HENKEL.

COMBINED POOL RACK AND BALL SPOTTER.

No. 10,801. Reissued Jan. 25. 1887.

WITNESSES

F. Willis Raines

P. J. Chvenger

INVENTOR

George Henkel by Chas. A. Stetson

Attorney

UNITED STATES PATENT OFFICE.

GEORGE HENKEL, OF SPRINGFIELD, OHIO.

COMBINED POOL-RACK AND BALL-SPOTTER.

SPECIFICATION forming part of Reissued Letters Patent No. 10,801, dated January 25, 1887.

Original No. 338,735, dated March 30, 1886. Application for reissue filed July 7, 1886. Serial No. 207,363.

*To all whom it may concern:*

Be it known that I, GEORGE HENKEL, of the city of Springfield, county of Clark, and State of Ohio, have invented certain new and useful Improvements in Combined Pool-Racks and Ball-Spotters, of which the following is a specification.

This invention relates to combined pool-racks and ball-spotters, and is intended as an improvement upon the invention described and claimed in an application for United States Letters Patent filed by me September 27, 1884, No. 144,107, to which reference may be had.

By reference to the application above mentioned it will be noticed that the rack proper which held the balls and the box which carried the balls to the table in the operation of spotting were separate with relation to each other, one being rigidly suspended above the table and the other being adjustable thereto, the rack being constructed in two oblong sections secured together at their inner ends and separated sufficiently to permit the travel of a box between them. In the invention referred to it was necessary to use great care in the operation of spotting the balls—*i. e.*, in lowering the box that received the balls from the rack and carried them to the table, as should the box be lowered suddenly and too far below the rack before all the balls rolled into it the balls were apt to jump out of the box and fall upon the table, which was injurious to the cloth.

The object of this my present invention is, primarily, to provide a rack which shall be compact and less complicated in construction than the rack described in the application referred to, doing away with the oblong projecting ball holders or sections, and providing a rack and spotter which shall be of but little greater diameter than the diameter of an ordinary triangle or "spotter;" another object of the invention being to provide the rack with vertical instead of horizontal (or inclined) ball-holders, and provide automatically-removable partitions to separate the ball-holders, whereby all the balls in the rack may roll together before the rack is lowered to "spot" them, and to also so construct the rack that the balls may be lowered within a quarter of an inch of the top of the table (more or less) before the balls are allowed to fall thereon, thus preventing noise and injury to the cloth.

With these objects in view my invention consists in a combined pool-rack and ball-spotter composed, essentially, of two boxes, one located within the other, the said boxes being preferably three-sided, or of triangular shape, and constructed mostly of wire, said boxes being separated sufficiently to receive a ball or balls between adjacent sides, and being adjustably suspended over a pool-table, the inside box being adapted to be automatically raised with relation to the outside box, to permit the balls to roll underneath its bottom, for the purpose and substantially as hereinafter described.

It also consists in certain details of construction hereinafter fully set forth.

Figure 2:
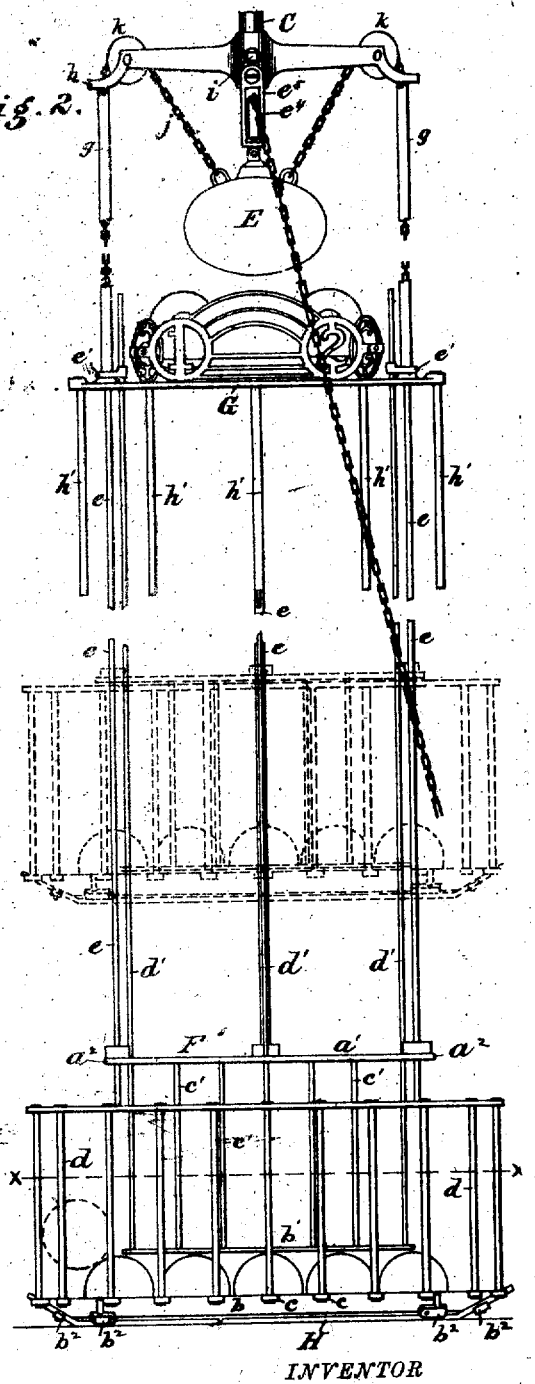
Figure 3:
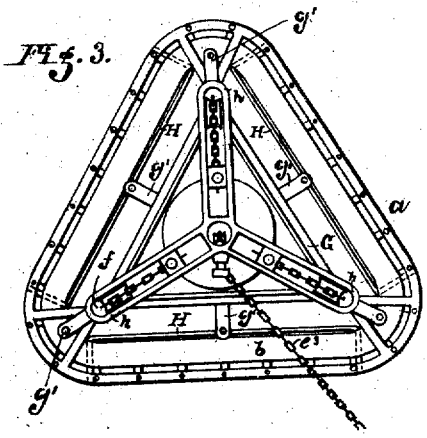
Figure 6:
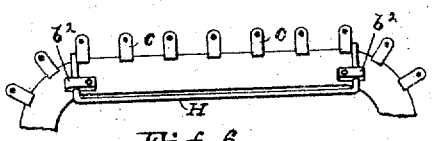
Figure 7:
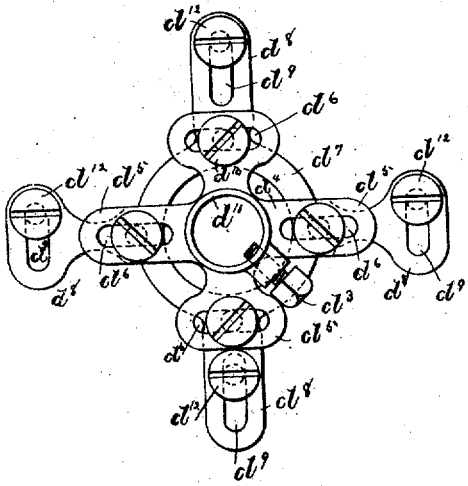
Figure 4:
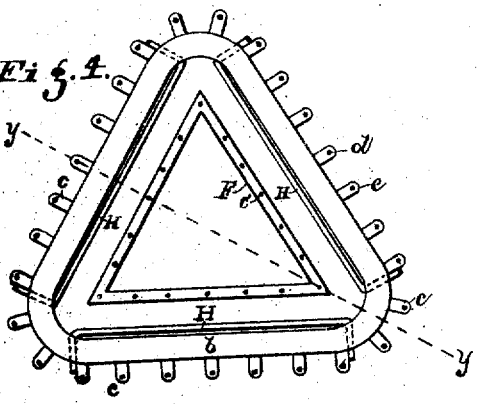
Figure 5:
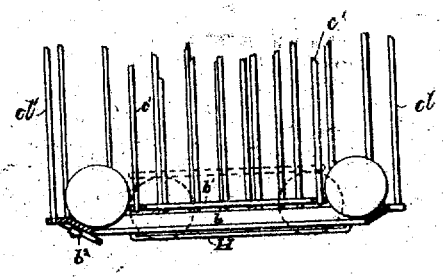

Figure 1 represents in side elevation a combined pool-ball rack and spotter suspended in its normal position above a pool-table, as constructed in accordance with my invention; Fig. 2, a side elevation of the rack and spotter, the said figure showing in full lines the rack as lowered to the table, the balls being "spotted." The dotted lines show the position of the boxes which form the rack just prior to spotting; Fig. 3, a plan view of Fig. 1, the supporting-rod being removed; Fig. 4, a section on dotted line *x x*, Fig. 2; Fig. 5, a transverse vertical section on dotted line *y y*, Fig. 4; Fig. 6, an under side view of a portion of the outside triangular-shaped box, showing the adjustable wire which forms a part of the triangle; and Fig. 7 is an under side view of an adjustable spider, by means of which the rack-supporting rod is secured to the ceiling.

In the drawings, A represents the outside ball-holding box, said box consisting of an upper triangular-shaped rim, *a*, a lower triangular-shaped partial bottom or internally-projecting flange, *b*, having a series of lugs, *c*, cast thereon and extending outward therefrom, and the vertical wires *d*, which connect the rim and bottom together, said wires extending through the rim *a* and lugs *c*, where they are riveted, the wires being sufficiently long to separate the rim and bottom the desired distance to hold the desired number of balls in a vertical line.

The rim $a$ and bottom $b$ will preferably be of cast metal, the bottom being slightly inclined toward the center of the box.

The box A as will be noticed by reference to the drawings, is open at the top and bottom, the bottom $b$ being projected inward from the sides preferably about the distance of half the diameter of an ordinary pool-ball, the opening at the bottom of the box thus formed being about the area or slightly greater than the area of fifteen pool-balls when placed close together in the form of an equilateral triangle. This box A is adjustably supported at a suitable distance above a pool-table by means of supporting-rods $e$, connected thereto at or near its three corners, as shown at $f$, Fig. 3, Sheet 2, and extending upward through and having their bearings in tubes $g$, which tubes are rigidly secured to the ends of arms $h$ of a bracket, B, at their upper ends, said bracket being secured to a supporting-rod, C, connected therewith by means of a screw-bolt, $i$, at its lower end, and at its upper end to the ceiling by means of an adjustable spider, D, as will be hereinafter more fully described.

The rods $e$, which support the box A, are in turn supported by means of chains $j$, secured to their upper ends and extending over sheaves or pulleys $k$, pivoted to the arms $h$ of the bracket B, where they extend downward and are attached to a counter-weight, E, which counter-weight counterbalances the weight of the balls when in the rack and retains the rack normally elevated.

Located upon the inside of the box A is a triangular-shaped box, F, which box is composed of a narrow upper rim, $a'$, and a lower rim, $b'$, which rims are secured together by wires $c'$, and in a manner similar to the construction of the box A said box F being open at top and bottom. The rim $a'$ of said box is provided with slightly-projecting lugs $a^2$ at its corners, which lugs loosely encircle the rods $e$, which support the outside box, A, which rods also retain the box in the desired relation to the outside box. The box F is also provided with three upwardly-projecting operating-rods, $d'$, which rods extend upward parallel to and in close proximity to the tubes $g$, and are provided at their upper ends with tube-encircling eyes $e'$, secured adjustably thereto by means of set-screws $f'$, the purpose of which will be hereinafter stated.

Attached to the lower ends of the tubes $g$ is a triangular-shaped brace, G, open preferably at its center, as shown in the drawings, Fig. 3, said brace having six (preferably) projecting lugs, $g'$, from which depend an equal number of wires or rods, $h'$, said wires or rods being equal in length, or nearly so, to the depth of the box A, these rods forming partitions to divide the box A into a suitable number of compartments or ball-holders when the box is in its normal position, or elevated above the table.

The box F is of such size and so arranged with relation to the outside box, A, as to leave space between its sides and the sides of the outside box sufficiently large to permit the easy entrance of the balls between the two boxes, the space thus afforded forming the ball-holders or rack.

Attached to the bottom $b$ of the outside box, A, by means of clamps $b^2$ are three wires, H, each wire extending the entire length, or nearly so, of each side of the bottom $b$, and forming together a triangle, which triangle governs the positioning of the balls as the rack is raised from the table. By attaching the wires H, which form together the triangle, by means of adjustable clamps $b^2$, as shown in the drawings, I am enabled to project the said wires more or less beyond the inner edges of the inclined bottom $b$ of the box. An adjustable triangle or "spotting-frame" is thus formed, which may be accommodated to balls of greater or less diameter, which is very desirable.

Fixed upon the upper side of the brace G is a series of numbers, which numbers are so arranged as to come opposite the spaces intermediate between the rods $h'$, which divide the space between the two boxes A F into ball-holding compartments.

The object of the brace G is especially to provide a brace for and retain the tubes $g$ rigid at their lower ends relative to one another, and thereby secure a rigid guide for the supporting-rods of the outside box during its travel.

If desired, the partitions which divide the space between the outside and inside box might be formed upon or a part with the outside box; but it is desirable to form them a part with the brace G, so that when the box is lowered to spot the balls they will be withdrawn from between the two boxes, thus allowing the balls to circulate around the said space, distributing them so that when the eyes $e'$ upon the operating-rods $d'$ of the box F strike against the brace G, (which they will when the rack is lowered to the desired place with relation to the table,) and the said box is thereby raised more or less with relation to the outside box, the balls will roll into the space of the bottom of the box A from all sides and will position themselves more readily.

In practice the rack will be arranged to be lowered to within one-quarter of an inch with relation to the table, and the eyes $e'$, which are connected to the upper ends of the rods $d'$, secured to the inner box, F, will be so located that when the boxes which constitute the rack approach this point the said eyes will strike the brace G and hold the box F against further downward movement, the outside box continuing the descent until sufficient space is made between the bottom of both boxes to allow the balls to roll into the triangle, where they will position themselves on account of the impetus given them through the inclination of the bottom of the box A. It will be noticed that the inner box, F, will bear slightly upon the upper side of the balls as the outside box is allowed to ascend, and until the upper rim, $a$, of box A contacts with the rim $a'$ of box F and carries said box up with it. This will prevent any possibility of displacement of the balls during spotting, the balls being drawn close together and spotted when the bottom of box A or its triangle is on a line with the center of the balls. The space formed between the inner edges of the bottom of the box A or its triangle is but slightly larger than the space occupied by fifteen balls, and not large enough for sixteen. Therefore, should an extra ball be placed in the rack by mistake, it will be caught between the outside and inside boxes, as the said boxes ascend, and carried back, not obstructing, however, the accurate spotting of fifteen balls. (See dotted lines, Fig. 2.) The counter-weight E is raised and lowered by means of the chain $e^3$, which extends over pulley $e^4$ upon a centrally-located arm, $e^5$, of the bracket B.

The rod C, which forms the main support for the rack, is secured to the ceiling by means of an adjustable spider, D, it being held in place in a collar, $d^{11}$, projecting from the under side of said spider, by means of a screw-bolt, $d^3$, as shown in Fig. 1, Sheet 1. This spider, as shown clearly in Fig. 7, is constructed in two pieces—an under piece, $d^4$, having four projecting arms, $d^5$, two of which arms have elongated slots $d^6$ at or near their ends, extending in the direction of their length, and two having elongated slots $d^6$, projecting in the direction of their width—*i. e.*, all the slots of the piece $d^4$ extend in one direction—and an upper piece, $d^7$, having four projecting arms, $d^8$, with slots $d^9$ extending at right angles to the slots in the under piece, $d^4$. The upper and lower plates, $d^4$ and $d^7$, are secured together by means of screws $d^{10}$, extending through the elongated slots $d^6$ and extended into screw-holes in the upper plate, $d^7$. The upper piece is secured to the ceiling, or to a wooden block attached to the ceiling, by means of the screws $d^{12}$, extended through the elongated slot $d^9$ into the said ceiling. The lower plate is provided with a centrally-projecting collar, $d^{11}$, into which the supporting-rod C is extended, and secured by means of the screw-bolt $d^3$.

The object of providing an adjustable spider to connect the rack to the ceiling is to provide a means for adjusting any slight irregularity in the position of the rack relatively to the table without taking the rack down after once connected to the ceiling.

I claim—

1. A pool-rack a portion of the frame of which includes a spotting-frame.

2. In a pool-rack and ball-spotter, a triangle or spotting-frame adjustable in size.

3. In a combined pool-rack and ball-spotter supported over a pool-table, two boxes triangular in shape located one within the other in such manner as to leave a ball-receiving space between adjacent sides, in combination with adjustable supporting mechanism, substantially as described, to raise and lower the said boxes with relation to the table, and means to lift the interior box up with relation to the exterior box, to allow the balls to roll upon the table, substantially as described.

4. In a pool-rack and ball-spotter, the combination, with the box A, triangular in shape and having the internally-projecting flange $b$ or bottom, and being open at top and bottom, as described, of the triangular-shaped box F, of smaller diameter, located therein, and mechanism, substantially as described, to raise and lower the said boxes with relation to the table to spot the balls, in the manner substantially as set forth.

5. The combination, in a combined pool-rack and ball-spotter, of the box A, triangular in shape, provided with an open inclined triangular-shaped bottom, $b$, as shown, the wires H, secured to the bottom of said box, as set forth, said wires H forming the triangle, and the inside box, F, located within the box A and adjustably connected therewith, all arranged and operating substantially as described, and for the purpose set forth.

6. The combination, in a combined pool-rack and ball-spotter, with the boxes A and F, constructed and arranged as described, of the supporting-rods $e$, guide-tubes $g$, brace G, provided with the depending partition-rods $h'$, the bracket B, supporting-rod C, spider D, and the chains $j$ and counter-weight E, all arranged to operate in the manner and for the purpose set forth.

7. In a pool-ball rack and spotter, the combination, with the triangular-shaped outside box, A, the supporting-rods $e$, and tubes $g$, of the inside box, F, constructed as described, its upwardly-projecting operating-rods $d'$, eyes or stops $e'$, adjustably secured thereto, and the brace G, against which the eyes $e'$ strike to stop the downward movement of the inner box in spotting the balls, the whole being adjustably supported above a table, in the manner substantially as described.

8. The combination, with the rack-supporting rod of a combined pool-rack and ball-spotter, of the spider D, consisting of the upper piece, $d^7$, having four arms provided with the elongated slots $d^9$, and the lower piece, $d^4$, having the four projecting arms provided with the elongated slots $d^6$, and the central depending collar, $d^{11}$, substantially as shown and described.

9. The combination, with the bottom of the outside triangular-shaped box, A, of the wires H, secured thereto by means of the adjustable clamps $b^2$, substantially as shown and described.

10. In a combined pool-rack and ball-spotter, the combination, with the outside triangular-shaped box, A, its supporting-rods $e$, and mechanism, substantially as shown and described, to raise and lower said box, of the inside triangular-shaped box, F, loosely connected to the supporting-rod *e*, as set forth, its operating-rods *d'*, provided with the adjustable eyes or stops *f'*, to govern its movement with relation to the box A, and the brace G, having the dividing-rods *h'* depending therefrom, all constructed and arranged in the manner and for the purpose described.

In witness whereof I have hereunto set my hand, at Springfield, Ohio, this 17th day of June, A. D. 1886.

GEORGE HENKEL.

In presence of—
P. J. CLEVENGER,
PAUL A. STALEY.